Patented Sept. 15, 1936

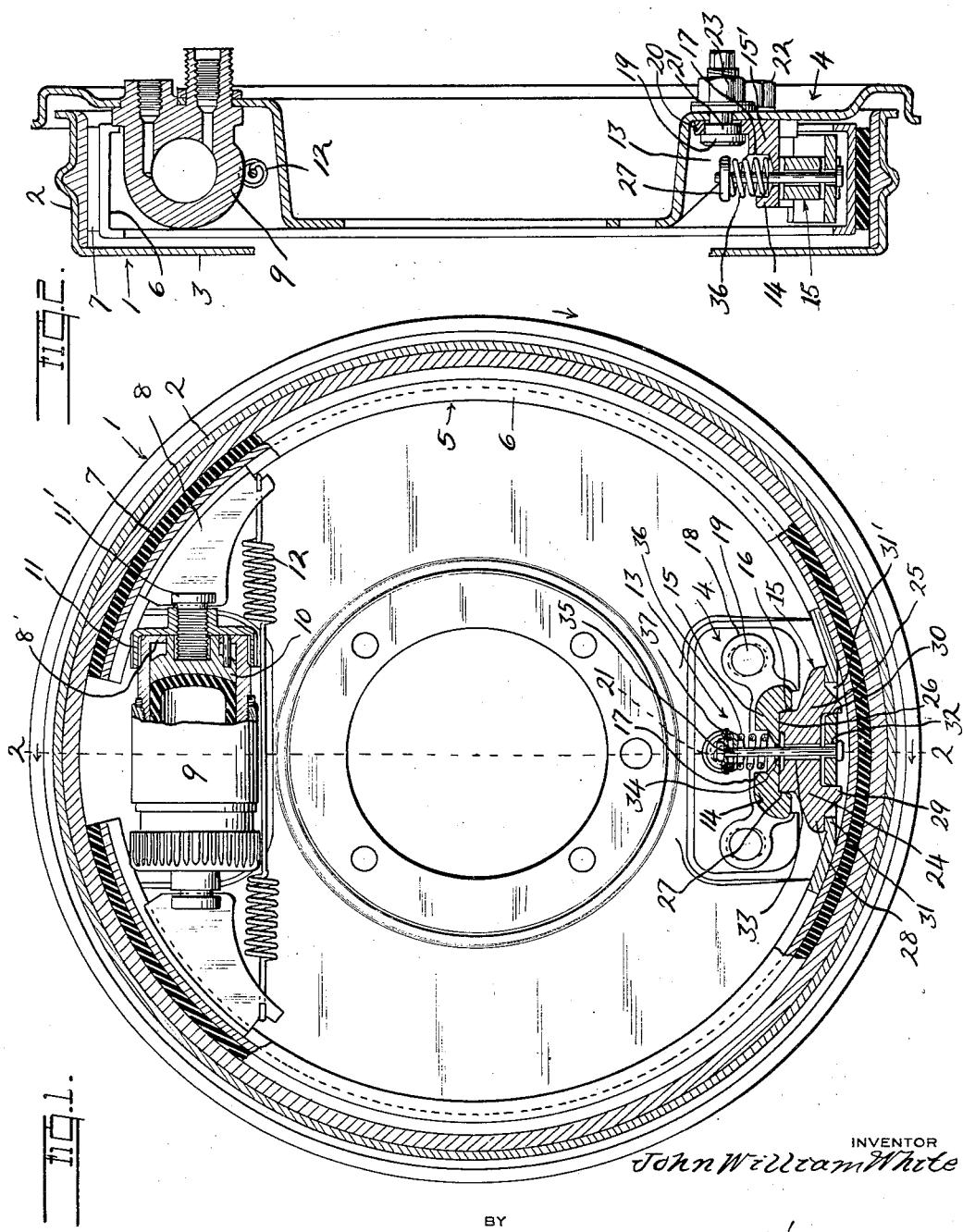

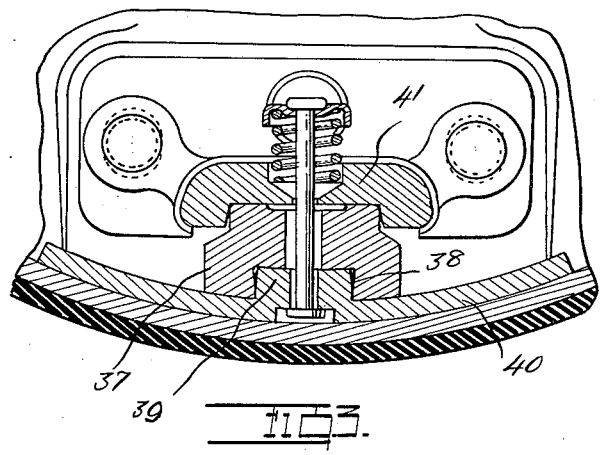
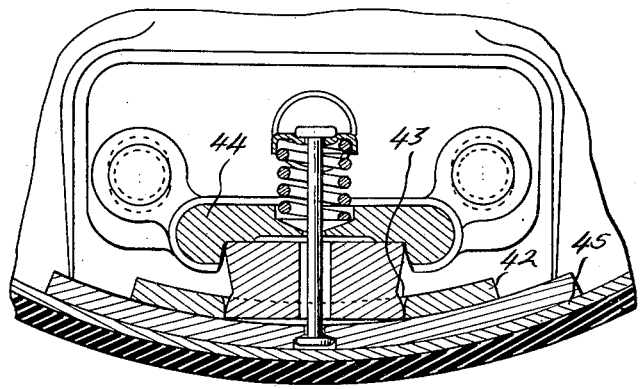

2,054,186

UNITED STATES PATENT OFFICE 2,054,186

BRAKE CONSTRUCTION

John William White, Detroit, Mich., assignor to Kelsey-Hayes Wheel Company, Detroit, Mich., a corporation of Delaware Application July 24, 1933, Serial No. 681,986

10 Claims. (Cl. 188—78)

The invention relates to brake constructions and refers more particularly to vehicle brake constructions of that type in which the brake friction means is within and movable outwardly into frictional contact with the brake flange of the brake drum.

In a brake construction in which the brake friction means is a transversely split brake band flexible throughout its length outward pressure upon the operation of the brake band intermediate its ends is used to regulate or secure proper working of the brake band. Heretofore, this outward pressure has been secured by different methods, such as a strut hinged to the brake band and a stationary anchor pin, a wedge member having an angular surface which slides over a stationary anchor member, or a bell crank hinged or journaled upon a stationary anchor pin having one arm operatively connected to the brake band to receive the torque delivered by the brake band when moved circumferentially and the other arm operatively arranged with respect to the brake band to deliver an outward pressure thereon. These various methods develop considerable friction which interferes with the accurate distribution of the torque and furthermore the constructions are such that it is difficult to properly lubricate the same, so that they often freeze.

One of the objects of my invention is to provide an improved brake construction which eliminates friction in the mechanical contraction and expansion of the brake friction means, thereby insuring uniform effect.

These and other objects of the invention will become apparent from the following description, taken in connection with the accompanying drawings, in which Figure 1 is a sectional elevation of a brake construction showing an embodiment of my invention;

Figure 2 is a cross section on the line 2—2 of Figure 1;

Figures 3 and 4 are views similar to portions of Figure 1, showing other embodiments of my invention.

Referring to Figures 1 and 2, 1 is the brake drum adapted to be secured to a wheel of a motor vehicle and having the annular brake flange 2 and the back 3. 4 is the backing plate for the brake drum. 5 is the brake friction means within the brake drum, this friction means being flexible and being in the nature of a flexible band which is transversely split at one point and which comprises the sheet metal band element 6 and the lining 7 secured to the outer face of the band element.

8 are brackets secured to the inner face of the band near its ends and 9 is the actuator for the friction means located between these brackets. The actuator, as illustrated in the present instance, is of the hydraulic type and has the pistons 10 which through the nuts 11 and the screws 11′ are adapted to spread apart the ends of the friction means. 12 is the retracting spring for the friction means connected to the brackets 8, the ends 8′ of the actuator housing being engageable with the nuts to limit the inward movement of the ends of the band.

The band is flexible throughout the portion of its length between the actuating brackets, so that it might be said that the friction means is flexible substantially throughout its length.

For the purpose of regulating and securing proper working of the portion of the friction means intermediate its ends, I have provided the device 13 which upon circumferential movement of the friction means is adapted to press the intermediate portion of the friction means outwardly against the annular flange of the brake drum. This device comprises the anchor bracket 14 mounted upon the backing plate 4 and the anchor block 15 between the anchor bracket and the friction means. The anchor bracket has the horizontally extending flange 15′ which is formed in its lower face with the downwardly opening recess 16 and in its upper face with the central upwardly opening recess 17. The anchor bracket also has integral with the horizontal flange the upwardly diverging arms 18 which are apertured to receive the securing bolts 19, which latter extend through parallel slots in the backing plate 4. These slots are parallel to a radial plane of the backing plate passing through the center of the anchor bracket. The upright flange 20 of the anchor bracket is provided with an opening for receiving the cam shaft 21, which latter extends through the backing plate 4. 22 are clamping nuts upon the bolts 19 and 23 is a clamping nut upon the cam shaft 21, suitable washers being provided between these nuts and the backing plate. The construction is such that by loosening up on the nuts 22 and 23 the cam shaft 21 may be rotated to move the anchor bracket radially inwardly or outwardly to provide a predetermined clearance between the intermediate portion of the friction means and the annular flange of the brake drum.

The anchor block 15 comprises the oppositely extending arms 24 and 25 which together form a projection at the top of the anchor block for engaging in the recess 16 of the anchor bracket. Each of these arms has a rocking bearing with the anchor bracket, each arm having the contact 26 adapted to rock about the fulcrum 27 formed at an upper corner of the recess, the ends of the recess being flared to provide for the rocking. Each arm also has the contact 28 and the outwardly extending projection 29. The projections provide on their nearest opposed faces contacts 30 which extend transversely of the contacts 28. 31 is a flexible sheet metal plate secured to the inner face of the intermediate portion of the band element 6 and having the openings 31' which are adapted to receive the projections 29, the portions of the plate laterally beyond the openings having their inner faces engageable with the contacts 28. The openings 31' are located so that the projections 29 are at opposite ends of the central portion of the plate between these openings and the contacts 30 upon these projections are engageable with the ends of this central portion. This central portion is provided with the radially extending openings 32 and the anchor block 15 and also the horizontal flange 15' of the anchor bracket are provided with the aligned radial openings 33 and 34, respectively, these latter openings, however, being of greater diameter. 35 is a headed pin extending through these openings and above the horizontal flange 15' and 36 is a coil spring encircling the pin and extending into the recess 17 and abutting its lower end and the washer 37 to place this pin under tension and to resiliently hold the plate 31 and the brake band element 6 against the anchor block 15 and the anchor block 15 against the anchor bracket 14.

By reason of the contacting surfaces of the anchor bracket, anchor block and plate being flat, accurate alignment of the parts may be assured.

The construction is such that when the actuator spreads apart the ends of the band to engage the lining with the brake drum, the lining and band will move circumferentially in the direction of rotation of the brake drum and assuming this direction to be as indicated by the arrow in Figure 1, it will be seen that the central portion of the plate 30 engages the contact of the projection 29 of the arm 24 and tends to move the anchor block 15 in the direction of rotation of the brake drum. As a result, the arm 24 fulcrums upon the anchor bracket, so that the contact 28 of the arm 25 exerts an outward pressure upon the plate 30 to force the adjacent portion of the brake band outwardly into engagement with the brake drum. In other words, the construction is such that one of the arms of the anchor block receives the thrust resulting from the circumferential movement of the brake band and rocks about the anchor bracket and the other of the arms exerts the outward force upon the brake band, this being true of either direction of rotation of the brake drum.

In the modification shown in Figure 3, the same general arrangement of parts is present, but the anchor block 37 has in its lower face the downwardly opening recess 38 which is engageable by the upwardly extending projection 39 upon the plate 40 which is secured to the inner face of the brake band. This plate 40 is also flexible and provides for flexing of the intermediate portion of the brake band, but distributes the outward pressure exerted by the anchor block upon rocking thereof about the anchor bracket 41. With this construction, it will be seen that the contacts upon the arms of the anchor block for receiving the circumferential thrust of the brake band are at opposite sides of the projection upon the plate.

In the modification shown in Figure 4, the plate 42 which provides for flexing of the intermediate portion of the brake band is formed with the opening 43, so that the anchor block 44 extends through this opening and is adapted to contact at its ends with the brake band 45. The lower corners of this anchor block are preferably rounded to facilitate rocking. In this construction, the shoulders for transmitting the circumferential thrust of the brake band are at opposite sides of the anchor block.

What I claim as my invention is:

1. The combination of a brake drum, brake friction means within and adapted to engage said drum, a stationary anchor member, a rocking anchor member having different bearings upon said stationary anchor member and friction means for each direction of rotation of said drum to press a portion of said friction means outwardly against said drum, and means other than said bearings for operatively connecting said friction means and rocking member to rock the latter upon circumferential movement of the former.

2. The combination of a brake drum, brake friction means within and adapted to engage said drum, a stationary anchor member, a rocking anchor member having separate rocking bearings upon said stationary anchor member and friction means for each direction of rotation of said drum to press a portion of said friction means outwardly against said drum, and means other than said bearings for operatively connecting said friction means and rocking member to rock the latter upon circumferential movement of the former.

3. The combination of a brake drum, a transversely split brake band within and adapted to engage said drum, said band having end portions and being flexible, a stationary anchor member, a rocking anchor member having separate rocking bearings upon said stationary anchor member and said band intermediate said end portions for each direction of rotation of said drum to press a portion of said band intermediate said end portions outwardly against said drum, and means other than said bearings for operatively connecting said band and rocking anchor member to rock the latter upon circumferential movement of the former.

4. The combination of a brake drum, a transversely split brake band within and adapted to engage said drum, said band having end portions and being flexible substantially throughout its length, a stationary anchor member having separate fulcrums, a rocking anchor member adapted to rock about a different one of said fulcrums for each direction of rotation of said drum, said rocking member also having separate contacts adapted to press a portion of said band intermediate said end portions outwardly against said drum with a different contact for each direction of rotation of said drum, and means other than said contacts for operatively connecting said band and rocking member to rock the latter upon circumferential movement of the former.

5. The combination of a brake drum, a transversely split flexible brake band within and adapted to engage said drum, a stationary anchor member having spaced fulcrums, a rocking anchor member having spaced contacts adapted to rock about said fulcrums with different contacts and fulcrums for each direction of rotation of said drum, said rocking anchor member also having spaced contacts adapted to press a portion of said band intermediate its ends outwardly against said drum with a different contact for each direction of rotation of said drum, said fulcrums and contacts being symmetrically arranged with respect to the median planes of said stationary and rocking anchor members, and means other than said contacts for operatively connecting said band and rocking anchor member to rock the latter upon circumferential movement of the former.

6. The combination of a brake drum, a transversely split brake band within and adapted to engage said drum, said band having end portions and being flexible substantially throughout its length, a stationary anchor member having separate fulcrums, a rocking anchor member having separate contacts adapted to rock about said fulcrums, said rocking member also having separate contacts adapted to press a portion of said band intermediate said end portions outwardly against said drum, means for operatively connecting said band and rocking member to rock the latter upon circumferential movement of the former, and means comprising a single spring for resiliently maintaining said band and anchor members in operative relation.

7. The combination of a brake drum, a transversely split flexible brake band within and adapted to engage said drum, a stationary anchor member having separate fulcrums, a rocking anchor member having oppositely extending arms, each arm having a contact adapted to rock about one of said fulcrums and a contact adapted to press a portion of said band intermediate its ends outwardly against said drum, and means for operatively connecting said band to said rocking member to rock the latter upon circumferential movement of the former.

8. The combination of a brake drum, brake friction means within and adapted to engage said drum, a stationary anchor member having separate fulcrums, a rocking anchor member having oppositely extending arms, each arm having a contact adapted to rock about one of said fulcrums, a contact adapted to press a portion of said friction means outwardly against said drum, and a contact extending transversely of said second mentioned contact, and means upon said friction means engageable with said last mentioned contacts for rocking said rocking anchor member upon circumferential movement of said friction means, one of said arms receiving the thrust caused by the circumferential movement of said friction means and the other of said arms exerting outward pressure upon said friction means for each direction of rotation of said drum.

9. The combination of a brake drum, brake friction means within and adapted to engage said drum, a stationary anchor member having separate fulcrums, a rocking anchor member having oppositely extending arms, each arm having a contact adapted to rock about one of said fulcrums, a contact adapted to press a portion of said friction means outwardly against said drum, and a contact extending transversely of said second mentioned contact, and means upon said friction means embracing said rocking anchor member and providing shoulders engageable with said last mentioned contacts for rocking said rocking anchor member upon circumferential movement of said friction means.

10. The combination of a brake drum, brake friction means within and adapted to engage said drum, a stationary anchor member having separate fulcrums, a rocking anchor member having oppositely extending arms, each arm having a contact adapted to rock about one of said fulcrums, a contact adapted to press a portion of said friction means outwardly against said drum, and a contact extending transversely of said second mentioned contact, and means upon said friction means extending between said last mentioned contacts and providing shoulders engageable with said last mentioned contacts for rocking said rocking anchor member upon circumferential movement of said friction means.

JOHN WILLIAM WHITE.